United States Patent [19]
Seitelman et al.

[11] Patent Number: 5,537,861
[45] Date of Patent: Jul. 23, 1996

[54] METHOD OF BALANCING A BLADED ROTOR

[75] Inventors: Leon H. Seitelman, Glastonbury; Johan van Achterberg, South Windsor; Soter P. Slomski, Vernon, all of Conn.

[73] Assignee: United Technologies Corporation, East Hartford, Conn.

[21] Appl. No.: 407,358

[22] Filed: Mar. 20, 1995

[51] Int. Cl.⁶ ................................................ G01M 1/00
[52] U.S. Cl. ................................................ 73/66; 364/508
[58] Field of Search .......................... 73/66, 460, 462, 73/660; 364/508, 573, 580; 74/573 R

[56] References Cited

U.S. PATENT DOCUMENTS

| | | | |
|---|---|---|---|
| 4,345,472 | 8/1982 | Hara et al. | 73/462 |
| 4,494,400 | 1/1985 | Hill | 73/1 B |
| 4,776,215 | 10/1988 | Curchod | 73/462 |
| 4,937,758 | 1/1990 | Hayden | 364/508 |
| 5,172,325 | 12/1992 | Heidari | 364/508 |
| 5,219,454 | 6/1993 | Class | 416/145 |
| 5,243,788 | 9/1993 | Rossmann et al. | 73/462 |

OTHER PUBLICATIONS

Lawrence D. Barrett and D. Shaw Siglin, *Computer Assisted Track and Balance Saves Flights*, pp. 351–360.
R. E. Kielb, *Mass Balancing of Hollow Fan Blades*, Oct. 1986, vol. 108, pp. 577–582.

Primary Examiner—Hezron E. Williams
Assistant Examiner—Christine K. Oda
Attorney, Agent, or Firm—Kenneth C. Baran

[57] ABSTRACT

A method disclosed] for balancing the fan rotor (10) of a turbine engine having a hub (12) with blades (16) extending radially therefrom includes the steps of determining (30) a penalty associated with each possible unique blade arrangement in which a limited number of blades is relocated from their initially assigned locations on the hub to new target locations. A subset of these arrangements is selected (34), the subset members being the arrangements having the lowest penalties. For each member of the subset, the penalty determination (36) is made for each possible unique blade arrangement in which a limited number of blades is relocated from their initial locations in each subset member to new target locations. If these latter penalty determinations identify an arrangement having a penalty less than that of any arrangement in the subset, the subset selection (34) and penalty determination steps (36) are repeated until no further reduction in penalty is observed. Once a blade arrangement having the smallest penalty is identified, the imbalance associated with that arrangement is compared (42) to a predetermined imbalance limit. If the imbalance is no greater than the limit, the blades (16) are deployed (44) on the hub in accordance with that arrangement.

10 Claims, 6 Drawing Sheets

| EXACT NUMBER OF BLADES MOVED (r) | NUMBER OF WAYS TO SELECT r BLADES FROM 22 BLADES | NUMBER OF WAYS TO MOVE EACH OF r BLADES TO A NEW LOCATION | TOTAL NUMBER OF ARRANGEMENTS |
|---|---|---|---|
| 4 | 7315 | 9 | 65835 |
| 3 | 1540 | 2 | 3080 |
| 2 | 231 | 1 | 231 |
| 1 | 22 | 0 | 0 |
| | | SUBTOTAL | 69146 |
| | | "AS IS" ARRANGEMENT | 1 |
| | | TOTAL | 69147 |

FIG. 3

METHOD OF BALANCING A BLADED ROTOR

TECHNICAL FIELD

This invention relates to the balancing of bladed rotors and in particular to the balancing of the fan rotor of a gas turbine engine.

BACKGROUND OF THE INVENTION

A bladed rotor, such as the fan rotor of a gas turbine engine, includes a central hub and a quantity of blades secured to and projecting radially outward from the hub. The rotor rotates about a longitudinal central axis. Because of nonuniform distribution of mass in the hub and blades, it is nearly impossible to achieve perfect balance for a bladed rotor. Nevertheless, minimizing rotor imbalance is essential for limiting vibration and noise during operation of the rotor. A rotor is considered to be balanced when its imbalance is no greater than a predetermined amount.

In cases where one or more unserviceable blades on a rotor are to be replaced by replacement blades, the rotor will usually require rebalancing since the replacement blades usually have a mass distribution different from that of the unserviceable blades. One way to rebalance the rotor has been to replace blades in pairs, the replacement blades of each pair having approximately equal mass distributions and being placed substantially 180 degrees opposite each other on the hub. The main drawback of this approach is that a perfectly serviceable blade is replaced along with the unserviceable blade. In the case of modern gas turbine engine fan rotors, the blades are expensive and replacing a serviceable blade is not cost effective.

A more attractive way to rebalance the rotor is to replace only the unserviceable blade and to rearrange at least some of the blades to restore the balance of the rotor. One well known prior art method for identifying how to rearrange the blades is known as simulated annealing. Simulated annealing exhibits good performance in identifying arrangements for reducing rotor imbalance. However simulated annealing examines a great many possible blade arrangements and frequently identifies arrangements in which many, if not most, of the blades are relocated from their initial locations to new target locations. Thus, simulated annealing entails considerable analysis to identify an acceptable blade arrangement. Moreover, the physical effort and time required to remove large numbers of blades from their initial locations and reinstall each of them in a new target location can be significant.

In view of the foregoing, a method of balancing a bladed rotor which limits the need for extensive analysis and physical effort is sought.

DISCLOSURE OF THE INVENTION

It is an object of the invention to balance a bladed rotor with a limited amount of analysis and physical effort.

It is a further object of the invention to reduce the time required to balance a bladed rotor.

According to the method of the present invention, a bladed rotor is balanced without excessive effort by limiting the number of blades that are eligible to be moved from their initial locations on the hub to new target locations.

According to one embodiment of this invention, the method includes determining a penalty associated with each possible unique blade arrangement in which a limited number of blades is relocated from their initially assigned locations on the hub to new target locations. A subset of these arrangements is selected, the subset members being the arrangements having the lowest penalties. For each member of the subset, the penalty determination is made for each possible unique blade arrangement in which a limited number of blades is relocated from their initial location in each subset member to new target locations. If these latter penalty determinations identify an arrangement having a penalty less than that of any arrangement in the subset, the subset selection and penalty determination steps are repeated until no further reduction in penalty is observed. Once a blade arrangement having the smallest penalty is identified, the imbalance associated with that arrangement is compared to a predetermined imbalance limit. If the imbalance is no greater than the limit, the blades are deployed on the hub in accordance with that arrangement.

In one detailed embodiment of the invention, the penalty represents the rotor imbalance. In another detailed embodiment, which is particularly useful when one or more unserviceable blades are to be replaced by replacement blades, the penalty depends on the rotor imbalance, the number of serviceable blades that must be relocated, and the initial and target locations of blades that must be relocated to achieve an acceptable balance.

The foregoing method and objects will become more apparent in light of the following description of the best mode for carrying out the invention and the accompanying drawings.

BRIEF DESCRIPTION OF THE FIGURES

FIG. 3 is a chart demonstrating the number of unique ways in which 4 blades cart be selected from a rotor having 22 blades.

BEST MODE FOR CARRYING OUT THE INVENTION

Figure 1:
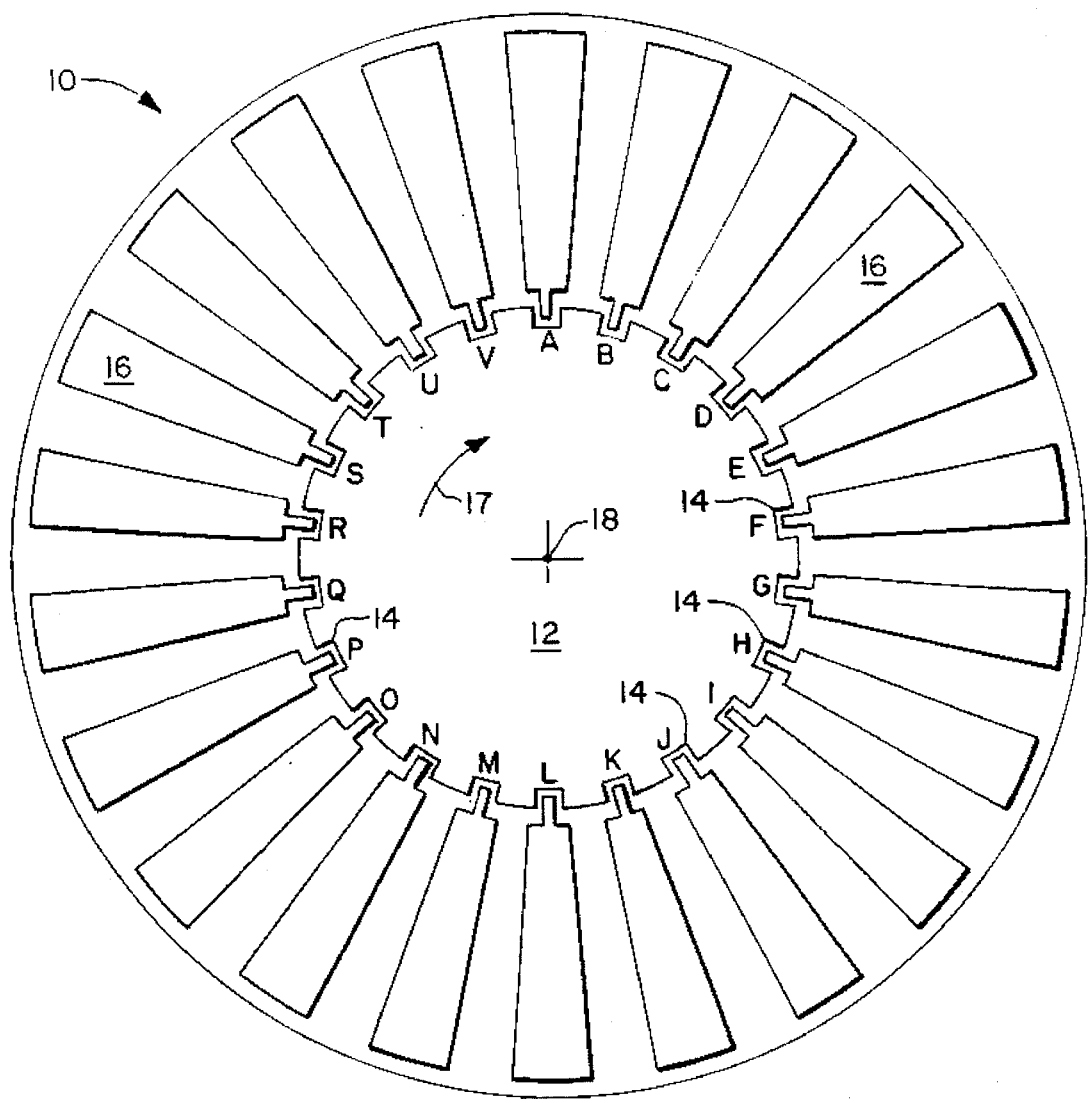
FIG. 1 is a schematic front elevation of a gas turbine engine fan rotor.

Referring to FIG. 1, a fan rotor 10 for a gas turbine engine has a central hub 12 with slots 14 in the periphery of the hub. Each slot receives a radially extending blade 16. The blades are locked in the slots by locking means not shown. The fan rotor rotates in direction 17 about a longitudinal central axis 18. Each blade and corresponding slot is labeled in the illustration with an upper case letter to facilitate identification of individual blades and slots.

The method of the invention can be used to determine the preferred blade locations for a rotor whose blades have not yet been installed, for example during factory assembly of a new rotor. The method is also applicable to the rebalancing of a rotor, one or more of whose blades has become damaged or is otherwise unserviceable and is to be replaced by a replacement blade. In either case, it is not necessary for blades to actually be installed on or rearranged on the rotor until their target locations, as defined by the invention, are known.

The method of the present invention can be understood by considering an example in which a rotor has a total of n blades (n=22), one of which is a replacement for an unserviceable blade. The remainder of the blades are nonreplacement blades. Each blade is assigned an initial location on the hub 12, i.e. a slot 14, to define an initial blade configuration. While the assignment can be arbitrary, it is more natural in this example to assign the replacement blade to the slot previously occupied by the unserviceable blade and to assign each remaining blade to the slot the blade already occupies.

Figure 2:
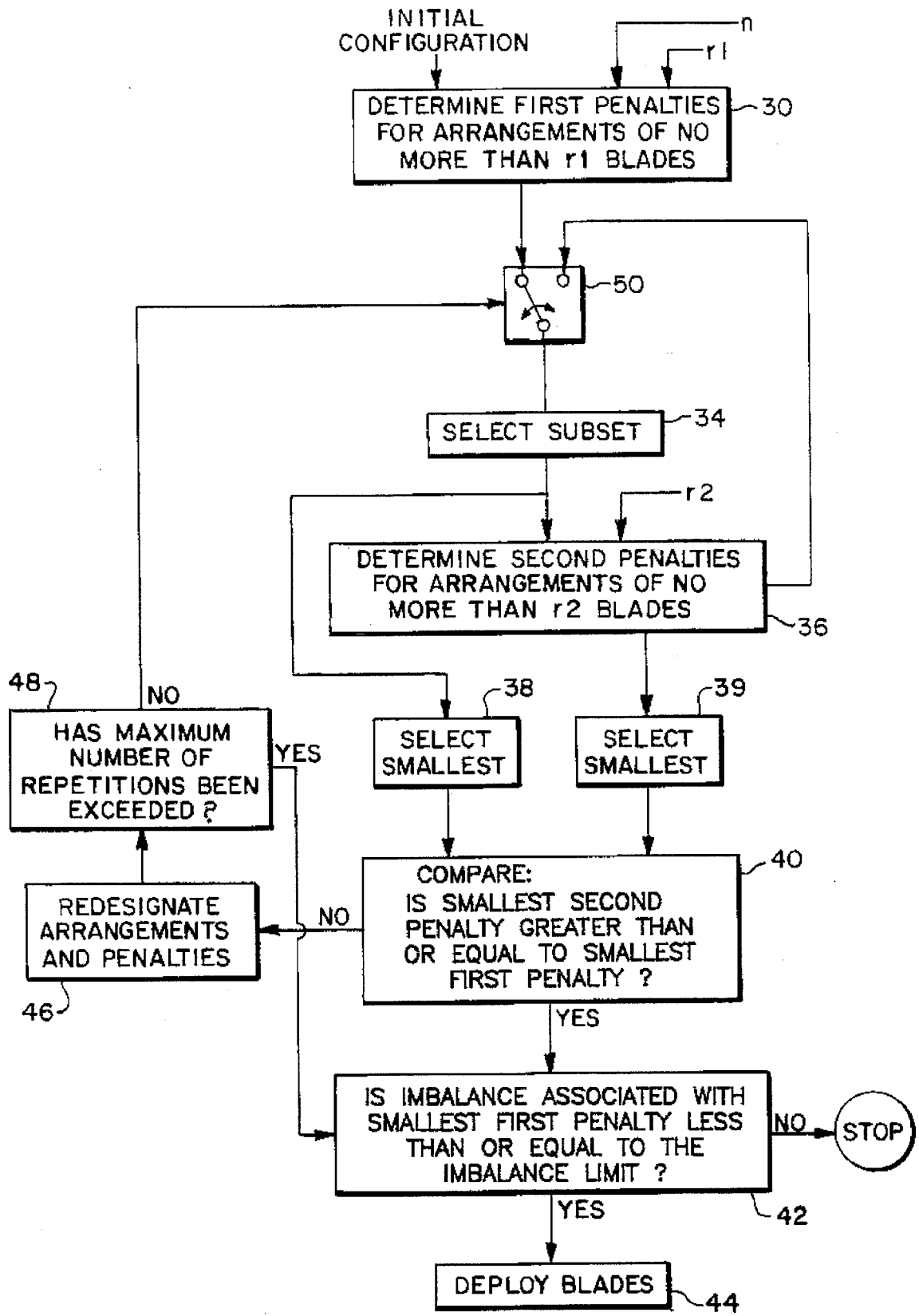
FIG. 2 is a flow diagram illustrating an embodiment of the balancing method of the present invention.

Referring to FIG. 2, the method begins with a determination step 30 in which a penalty (to be discussed more completely below) is associated with each unique arrangement of the blades in which no more than a small number r1 of blades are eligible to be relocated from their initial locations in the initial configuration to new target locations. The penalty determination is done analytically and therefore the blades are not actually moved in order to carry out the determination. Since r1 represents the number of blades that are eligible to be relocated, large values of r1 increase the likelihood of identifying a balanced blade arrangement. However large r1 values also correspond to a large analysis effort and potentially large physical effort to relocate the blades. This is contrary to the objects of the invention, and therefore a small value of r1 is preferred. For a rotor where the number of blades, n, is 22 (as shown in FIG. 1), r1=4 has been selected as a reasonable compromise for the preferred embodiment of the invention.

The blade arrangements and the penalties associated with those arrangements in the determination step 30 are referred to as first arrangements and first penalties to distinguish them from arrangements and associated penalties which are considered at a subsequent step in the method. The subsequent arrangements and penalties are referred to as second arrangements and penalties.

Since the goal of the method is to balance the rotor, the penalty for any given blade arrangement represents at least the rotor imbalance resulting from the given arrangement. The imbalance is calculated by any convenient method known in the art. The exact method of calculating the imbalance is not embraced by the invention and therefore is not described. As discussed below, it may be desirable for the penalty to also account for factors other than the rotor imbalance.

The blade arrangements considered by the determination step 30 are those arrangements in which no more than r1 of the n blades are relocated from their initial location to a new target location. The exact meaning of this statement can be illustrated by well known combinatorial mathematics. It is emphasized, however, that neither the combinatorial mathematics, nor any algorithm for enumerating the possible blade combinations is part of the invention.

For any given selection of 4 blades there are 4 factorial or 24 ways to reorder those four blades among themselves on the hub. One of these ways leaves each of the 4 selected blades in its initial location. Six of these ways leave two blades in their initial locations and interchange the other two. Eight of these ways leaves one blade in its initial location and relocates the other three. Nine of these ways relocates each of the four blades to a target location different from its initial position.

There is, however, not one but a total of 7315 ways that four blades can be selected from the 22 blades on the rotor. Therefore, there are a total of 175560 (7315×24) possible blade arrangements. However only 69147 of these arrangements are unique. The remaining 106413 are duplicates of other arrangements. This can be seen in the tabulation of FIG. 3 which shows that there are 7315 ways to select 4 blades from the 22 blade population, and, as discussed above, 9 ways to reorder each selection of four blades among themselves on the hub so that each of the four selected blades is at a target location different from its initial location. Accordingly, there are only 65835 (7315×9) blade arrangements in which exactly four blades are relocated. Similarly, there are 1540 ways to select 3 blades from the 22 blade population and 2 ways to reorder each selection of three blades among themselves so that each of the three selected blades is at a target location different from its initial location. Accordingly, there are only 3080 (1540×2) blade arrangements in which exactly three blades are relocated. The tabulation shows that there are 231 ways in which exactly two blades can be relocated, and no ways in which one blade can be relocated (since there is no slot into which the blade can be moved other than the slot the blade initially occupied). In addition, there is one arrangement in which no blades are relocated (i.e. leave all the blades in their initial location). Thus, for a rotor having n=22 blades and for r1=4, there are 69147 possible unique arrangements considered at step 30.

Referring again to FIG. 2, several additional steps are carried out subsequent to determination step 30. Selection step 34 selects a subset of the first arrangements. The selection criterion is that the penalty associated with each selected arrangement is no greater than the penalty associated with any nonselected arrangement. That is, the selected arrangements are the blade arrangements having the smallest penalties. In the preferred embodiment the subset includes only a single arrangement, however larger subsets can also be used. Larger subsets improve the likelihood of identifying a balanced blade arrangement, but also increase the analysis effort that will be expended in subsequent steps of the method.

Following selection step 34, determination step 36 determines, for each member of the subset, a penalty associated with each unique arrangement of the blades in which no more than a small additional number r2 of blades is eligible to be moved from their initial locations in the subset arrangement to new target locations. The arrangements considered at step 36 are referred to as second arrangements to distinguish them from the first arrangements considered at step 30. Large values of r2, like large values of value r1, increase the likelihood of identifying a balanced blade arrangement, but also increase the analysis effort and the physical effort of actually carrying out the blade relocation. Clearly, r2 must be less than n. Preferably r2 is no mere than r1 and most preferably r2 is less than r1. For a rotor having 22 blades, r2=3 has been selected as a reasonable compromise for the preferred embodiment of the invention. The arrangements for which penalties are determined in step 36 are similar to those considered in step 30—specifically those unique blade arrangements of each member of the subset in which no more than r2 blades are relocated from their initial locations in a subset member to new, target locations. Likewise, the penalties of step 36 include the same factor or factors as the penalties of step 30.

In the preferred embodiment, the subset of step 34 includes only a single member and r2=3. Therefore step 36 makes 3312 penalty determinations (3080 determinations in which 3 blades are relocated, 231 in which 2 blades are relocated and one in which no blades are relocated. The 3312 determinations of step 34 and the 69147 determinations of step 30 add up to a total of 72459 determinations. Modern computational tools can carry out a single determination in approximately a millisecond, so that the total number of determinations in this example can be accomplished in slightly over one minute. By contrast, there are 22 factorial (over a trillion billion) determinations that would be required if all possible rearrangements were to be evaluated. Even at the rate of one determination per millisecond, this vast number of determinations would overwhelm the most advanced computational tools. The smallest of the first penalties and the smallest of the second penalties are selected in steps 38 and 39. These smallest penalties are compared at step 40. If the smallest second penalty is no less than the smallest first penalty, the inclusion of the r2 additional eligible blades at step 36 did not result in the identification of a blade arrangement having a lower penalty than the best (lowest penalty) arrangement determined at step 30 (and included in the subset at step 34). Therefore, provided the imbalance associated with the smallest first penalty does not exceed a predetermined imbalance limit, for example 2900 gram centimeters (approximately 40 ounce-inches), as shown by step 42, the blades are physically deployed on the hub, step 44, in accordance with the first arrangement corresponding to the smallest first penalty. In this case, no more than r1 blades (4 blades in the example) will require relocation.

If the comparison 40 shows that the inclusion of the additional r2 blades has resulted in the identification of a blade arrangement superior to (i.e. having a smaller penalty than) the best arrangement of determination step 30, the first arrangements of step 30 are disregarded, the second arrangements of step 36 are redesignated in step 46 as first arrangements (since a subsequent determination step will yield a new group of second arrangements), and the subset selection step 34, determination step 36, and select and compare steps 38, 39, 40 are repeated. The repetition of the subset selection step 34, and any additional subsequent repetitions of step 34, select from the arrangements of step 36 (now redesignated as first arrangements) rather than from the arrangements of step 30. This is indicated in the flow chart by switch 50 which changes polarity the first time the redesignation step is carried out. The number of repetitions is limited to a predetermined maximum at step 48. If this limit is exceeded, steps 42 and 44 are carried out as previously described. In the present example steps 34, 36, 38, 39, 40 and 42 will be carried out no more than six times. This follows from the observation that arrangements of up to 4 blades are considered in step 30. Each time the additional steps are carried out, up to 3 additional blades are added to the group eligible to be relocated. Carrying out the additional steps six times identifies arrangements of up to 22 blades (4+6×3) which is the total number of blades on the rotor.

It is not guaranteed that the method of this invention will successfully identify a blade arrangement whose imbalance is lower than the predetermined imbalance limit. In the event that the method fails to identify an acceptable blade arrangement, it will be necessary to resort to any suitable prior art technique (for example simulated annealing) to determine the best way to achieve a balanced rotor. However experimental trials of the invention have usually identified an acceptable arrangement by the first time step 42 is reached. Such arrangements will require that no more than 7 blades (the sum of r1 and r2 where r1=4 and r2=3) be relocated to achieve an acceptable imbalance.

As discussed previously, each penalty determined at steps 30 and 36 represents at least the rotor imbalance resulting from the blade arrangement associated with the penalty. When a rotor is being balanced because one or more unserviceable blades is being replaced by replacement blades, other considerations may also be important, for example the physical effort associated with actually moving blades from an initial location in the initial configuration to a new target location. When such considerations are included, the preferred arrangement may be one having a higher imbalance than another arrangement, but whose penalty is lower. Of course the higher imbalance of the preferred arrangement must still be less than the predetermined limit.

Figure 7:
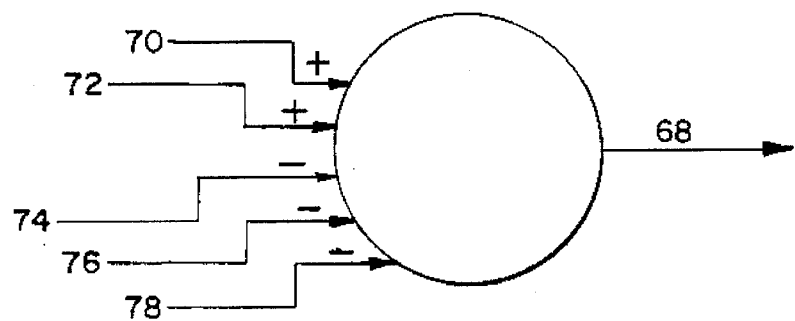
FIG. 7 is a flow diagram illustrating the determination of a penalty based on multiple additive terms and penalty reduction terms.

For example, the balancing method of the present invention is particularly useful when a damaged fan blade of a modern gas turbine engine is to be replaced by a replacement blade, the remaining blades being nonreplacement blades. Each blade arrangement identified by the method includes a group of blades, which may or may not include the replacement blade, each of whose initial location in the initial configuration differs from its target location. It is desired to achieve an acceptable imbalance while limiting the physical effort of relocating blades. Accordingly, as seen in FIG. 7, the penalty 68 associated with a blade arrangement includes a first additive penalty term 70 representing the rotor imbalance. The penalty also includes a second additive penalty term 72 representing the number of nonreplacement blades in the group of blades to be relocated. The second additive term accounts for the effort of physically moving the blades and favors arrangements which require the movement of a small number of blades rather than a large number of blades.

The penalty determination also includes penalty reduction terms 74, 76, 78. These terms are included because certain choices of blades to be moved are less undesirable than other choices.

The first penalty reduction term 74 represents the number of pairs of blades in the group whose initial location in the initial configuration are adjacent. The first penalty reduction term is included because, for the particular gas turbine engine of interest, removal and installation of blades from adjacent hub slots is easier than removal and installation from nonadjacent slots.

The second penalty reduction term 76 represents the number of pairs of blades in the group whose initial locations in the initial configuration are substantially opposite each other. The second penalty reduction term is included because of the large diameters of modern gas turbine engine fan rotors (nearly three meters in some cases). The maintenance personnel carrying out the blade movements must often manually rotate the rotor to bring a blade or slot of interest within easy reach. If blades are removed from slots that are approximately 180 degrees opposite each other on the hub, the rotor remains approximately balanced thereby easing the tasks of manually rotating the rotor into a desired position and keeping the rotor stationary once the desired position is attained.

The third penalty reduction term 78 represents the number of pairs of blades in the group that are pairwise exchanged. A pair of blades is considered to be pairwise exchanged if the initial location in the initial configuration of one blade is the target location of the other blade, and the initial location of the other blade in the initial configuration is the target location of the one blade. The penalty reduction for pairwise exchange is included because a pairwise exchange is conceptually easy to visualize and plan.

The additive penalty terms and the penalty reduction terms may be defined by constants or by polynomials of first or higher degree. For example, the first additive penalty term may be defined by a polynomial whose independent variable is the imbalance. The second additive penalty term may be defined by a polynomial whose independent variable is the number of nonreplacement blades that must be relocated. The exact form of each definition depends on the importance of the defined term relative to the other terms and on how the term's importance should vary for a particular rotor of interest. Thus, the practitioner of the method must decide which factors are important, how important they are relative to each other, how each factor should vary (if at all) and must then define the polynomial coefficients to model these decisions. For example, the second penalty reduction term is a piecewise linear function. Referring to FIG. 1, if blades A and L are two of the blades to be moved, the second penalty reduction term awards its maximum reduction since these blades are 180 degrees apart. If blades A and M are to be moved, a substantially smaller reduction is awarded. If blades A and N are to be moved, no reduction is awarded.

With the exception of the term representing the rotor imbalance, the inclusion or exclusion of various penalty terms depends on their importance in assessing the effort associated with blade relocations. For example, the second penalty reduction term may not be appropriate if the method of the invention is applied to a small diameter rotor that can be manually rotated with ease regardless of which blades have been removed. On the other hand, considerations other than those discussed above may be important enough for a particular rotor of interest to warrant the inclusion of corresponding terms in the penalty determination.

Figure 4:
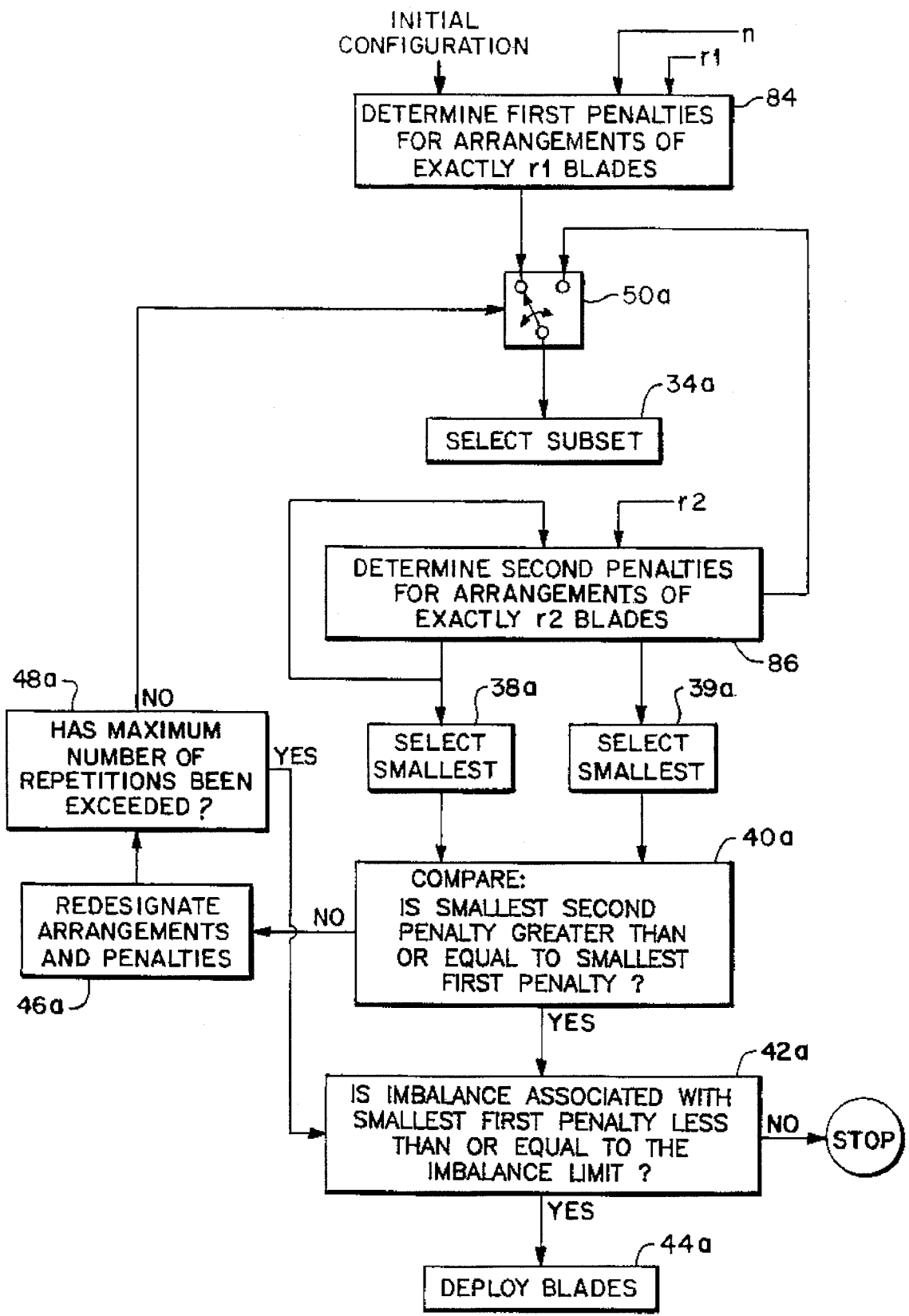
FIG. 4 is a flow diagram illustrating an alternative embodiment of the balancing method of the present invention.

FIG. 4 shows an alternative method similar to the method of FIG. 2, the letter "a" being appended to the method steps of FIG. 4 which are identical to the corresponding steps of FIG. 2. The method of FIG. 4 is identical to that of FIG. 2 except that determination steps 30, 36 (FIG. 2) are replaced by determination steps 84, 86. Determination steps 84 and 86 in the method of FIG. 4 only consider arrangements of exactly r1 and r2 blades rather than the "no more than r1" and "no more than r2" blades of the method of FIG. 2. This change slightly reduces the number of arrangements for which penalties are determined and therefore reduces the analysis effort. In all other respects, the method of FIG. 4 is identical to that of FIG. 2.

Figure 5:
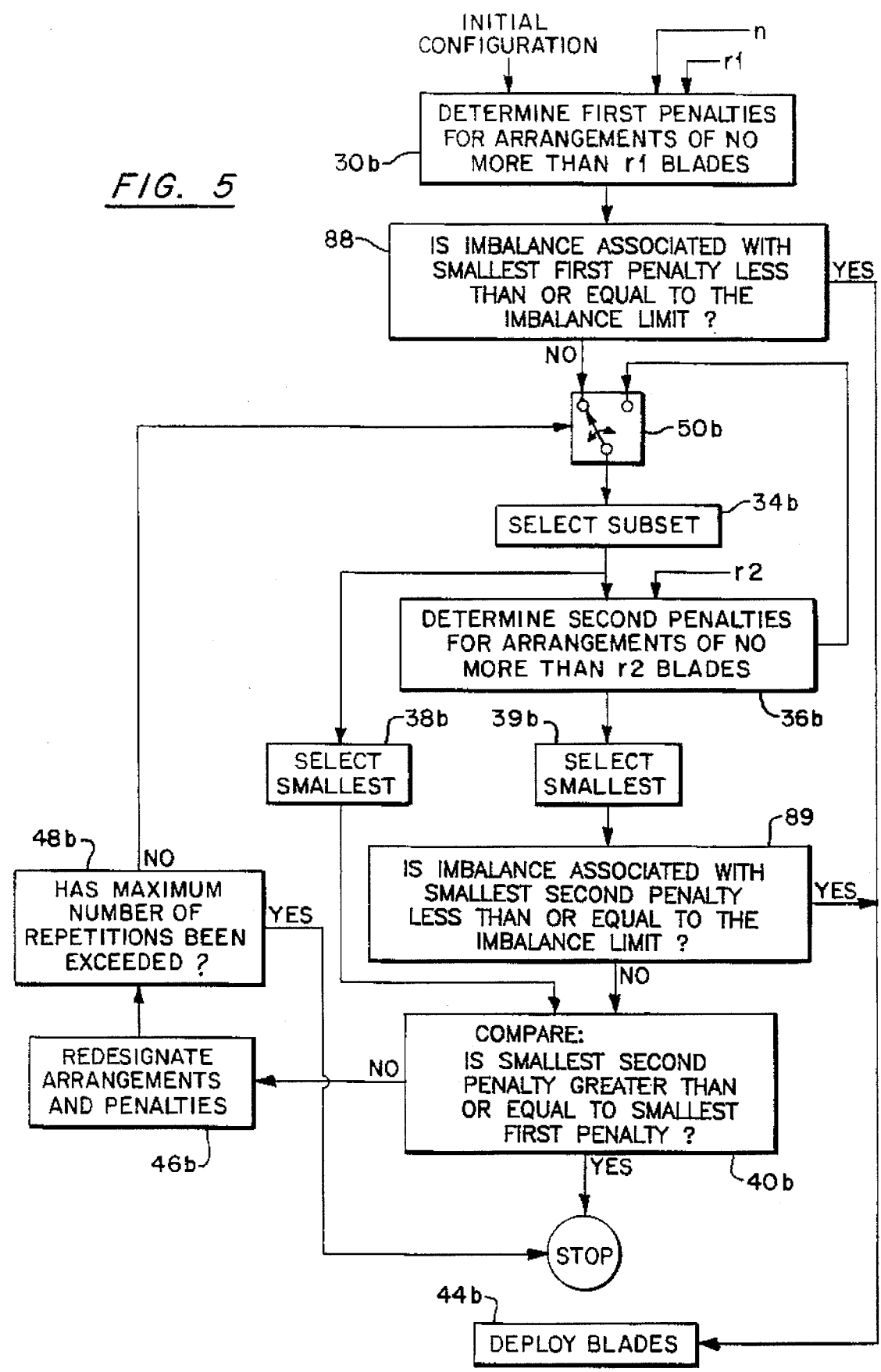
FIG. 5 is a flow diagram illustrating another alternative embodiment of the balancing method of the present invention.

FIG. 5 shows another alternative method similar to the method of FIG. 2, the letter "b" being appended to the method steps of FIG. 5 which are identical to the corresponding steps of FIG. 2. The method of FIG. 5 includes steps 88 and 89 (which have no direct analogs in the methods of FIGS. 2 and 4), but does not include a step corresponding to step 42. The added steps 88, 89 have the effect of discontinuing the method as soon as a blade arrangement having an acceptable balance is identified. In the method of FIG. 5, the imbalance associated with the smallest of the first penalties of step 30b is compared to a predetermined imbalance limit at step 88. If the imbalance is no greater than the limit, the rotor blades are deployed on the hub in accordance with the blade arrangement corresponding to the smallest first penalty. Otherwise, the method proceeds to selection and determination steps 34b, 36b. Following determination step 36b, the imbalance associated with the smallest of the second penalties of step 36b is compared to the predetermined imbalance limit at step 89. If the imbalance at step 89 is no greater than the imbalance limit, the rotor blades are deployed on the hub in accordance with the blade arrangement corresponding to the smallest second penalty. Otherwise comparison step 40b is carried out to decide if the smallest second penalty is at least as large as the smallest first penalty. If so, then the inclusion of r2 additional eligible blades at step 36b did not result in the identification of a better arrangement than the best arrangement of step 30b. Moreover, steps 88 and 89 have already established that the imbalances associated with the smallest first and second penalties do not correspond to an imbalance less than or equal to the imbalance limit. Therefore, the search for a balanced arrangement is discontinued and a prior art method must be resorted to. If the comparison 40b shows that the smallest second penalty is less than the smallest first penalty, redesignation step 46b is carried out and, provided the maximum number of repetitions has not been exceeded (step 48b), the additional steps beginning at 34b are repeated.

Figure 6:
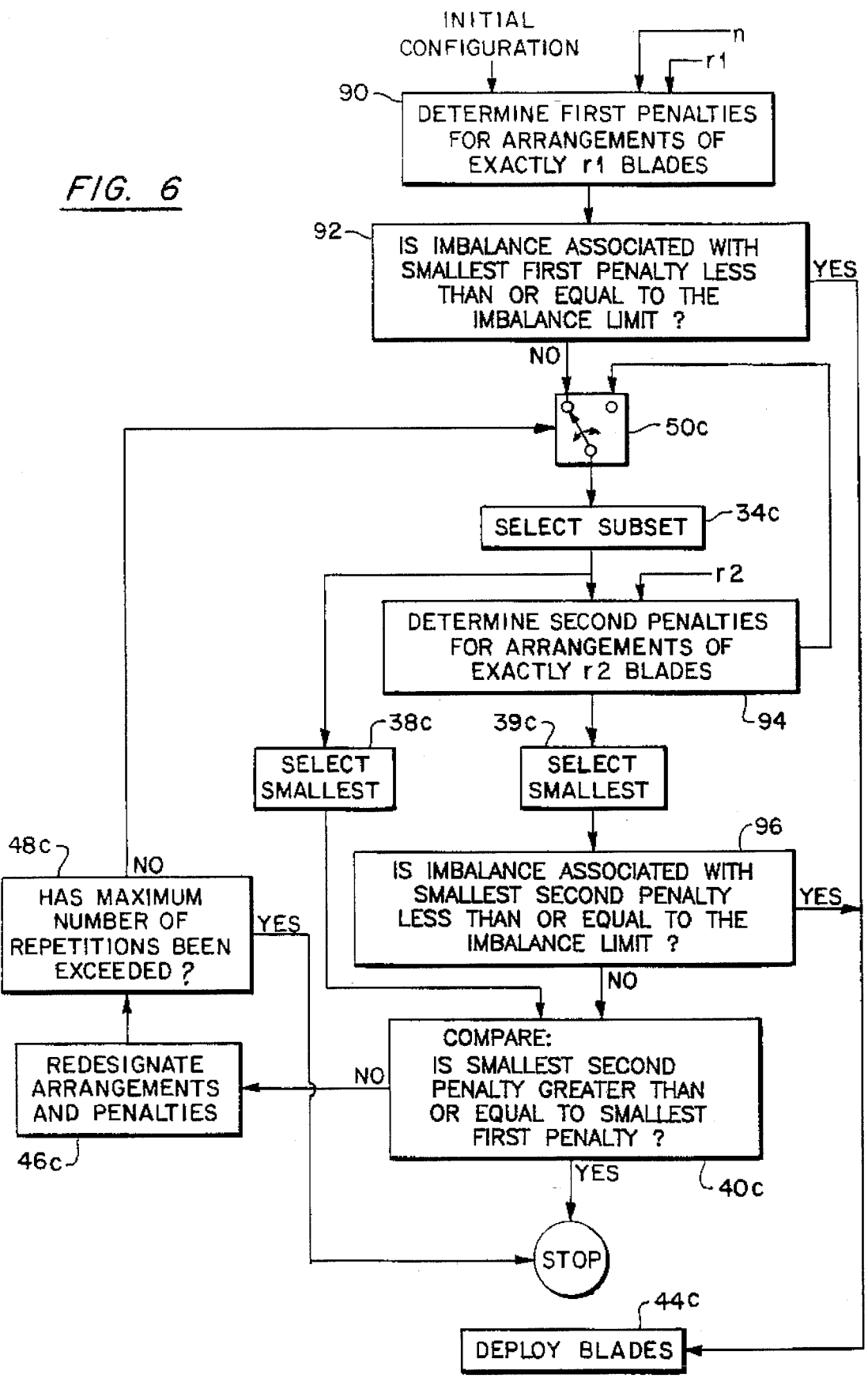
FIG. 6 is a flow diagram illustrating yet another alternative embodiment of the balancing method of the present invention.

FIG. 6 shows still another alternative method similar to the methods of FIG. 5, the letter "c" being appended to the method steps of FIG. 6 which are identical to the corresponding "b" steps of FIG. 5. In addition, steps 92 and 96 which are the same as steps 88 and 89 of FIG. 5 are included. Determination steps 90 and 94 in the method of FIG. 6 only consider arrangements of exactly r1 and r2 blades rather than "no more than r1" and "no more than r2" as in the method of FIG. 5. In all other respects, the method of FIG. 6 is identical to that of FIG. 5.

Although the method of the invention limits the amount of analysis necessary to identify a blade arrangement having an acceptable imbalance, the number of arrangements considered (72459 arrangements in the example presented in this specification) is still quite large. Therefore, in practice, the method steps will be carried out with the assistance of a computational aid such as a modern digital computer. The computer will, of course, also require algorithms, not embraced by the invention, to enumerate the blade arrangements and to calculate the rotor imbalance and other terms included in the penalties. The information supplied to the computer as inputs (or determinable from the inputs) include the number of blades n, the number of blades (r1 and r2) eligible for relocation, an imbalance limit, the imbalance of the hub and the imbalance of the individual blades.

The invention has been presented in the context of balancing the fan rotor of a gas turbine engine, however its applicability extends to other bladed rotors as well. Emphasis was placed on balancing a rotor when one or more unserviceable blades are to be replaced by replacement blades. However the method also is applicable to the balancing of a rotor during its initial assembly or to the balancing of a previously assembled rotor whose imbalance, due to factors other than damaged blades, exceeds an acceptable imbalance limit.

We claim:

1. A method of balancing a bladed rotor having a central hub for receiving a quantity of n removable, radially projecting blades, each of the blades being assigned an initial location on the hub to define an initial configuration of the blades, the method characterized by the steps of:

determining, for the initial configuration, a first penalty associated with each unique first blade arrangement which relocates no more than r1 blades from the locations initially occupied by those no more than r1 blades in the initial configuration to new target locations, r1 being a non-negative integer less than n, and the first penalty representing at least the rotor imbalance; and performing additional steps including:

selecting members for inclusion in a subset of the first arrangements, each subset member being a first arrangement having a penalty no greater than that of any nonselected first arrangement;

determining, for each subset member, a second penalty associated with each unique second blade arrangement which relocates no more than r2 blades from the locations initially occupied by those r2 blades in the subset member to new target locations, r2 being a non-negative integer less than n, and the second penalty representing at least the rotor imbalance;

comparing the smallest of the first penalties to the smallest of the second penalties and;

in the event that the smallest second penalty is no less than the smallest first penalty and the imbalance associated with the smallest first penalty is no greater than a predetermined imbalance limit, deploying the blades in the hub in accordance with the first arrangement corresponding to the smallest first penalty and;

in the event that the smallest second penalty is less than the smallest first penalty, redesignating the second penalties as first penalties, redesignating the second arrangements as first arrangements and repeating the additional steps no more than a predetermined number of times.

2. A method of balancing a bladed rotor having a central hub for receiving a quantity of n removable, radially projecting blades, each of the blades being assigned an initial location on the hub to define an initial configuration of the blades, the method characterized by the steps of:

determining, for the initial configuration, a first penalty associated with each unique first blade arrangement which relocates exactly r1 blades from the locations initially occupied by those exactly r1 blades in the initial configuration to new target locations, r1 being a non-negative integer less than n, and the first penalty representing at least the rotor imbalance; and performing additional steps including:

selecting members for inclusion in a subset of the first arrangements, each subset member being a first arrangement having a penalty no greater than that of any nonselected first arrangement;

determining, for each subset member, a second penalty associated with each unique second blade arrangement which relocates exactly r2 blades from the locations initially occupied by those r2 blades in the subset member to new target locations, r2 being a non-negative integer less than n, and the second penalty representing at least the rotor imbalance;

comparing the smallest of the first penalties to the smallest of the second penalties and;

in the event that the smallest second penalty is no less than the smallest first penalty and the imbalance associated with the smallest first penalty is no greater than a predetermined imbalance limit, deploying the blades in the hub in accordance with the first arrangement corresponding to the smallest first penalty and;

in the event that the smallest second penalty is less than the smallest first penalty, redesignating the second penalties as first penalties, redesignating the second arrangements as first arrangements and repeating the additional steps no more than a predetermined number of times.

3. A method of balancing a bladed rotor having a central hub for receiving a quantity of n removable, radially projecting blades, each of the blades being assigned an initial location on the hub to define an initial configuration of the blades, the method characterized by the steps of:

determining, for the initial configuration, a first penalty associated with each unique first blade arrangement which relocates no more than r1 blades from the locations initially occupied by those no more than r1 blades in the initial configuration to new target locations, r1 being a non-negative integer less than n, and the first penalty representing at least the rotor imbalance and;

in the event that the imbalance associated with the smallest of the first penalties is no greater than a predetermined imbalance limit, deploying the blades in the hub in accordance with the first arrangement corresponding to the smallest first penalty, and in the event that the imbalance associated with the smallest of the first penalties is greater than the predetermined imbalance limit, performing additional steps including:

selecting members for inclusion in a subset of the first arrangements, each subset member being a first arrangement having a penalty no greater than that of any nonselected first arrangement;

determining, for each subset member, a second penalty associated with each unique second blade arrangement which relocates no more than r2 blades from the locations initially occupied by those r2 blades in the subset member to new target locations, r2 being a non-negative integer less than n, and the second penalty representing at least the rotor imbalance, and;

in the event that the imbalance associated with the smallest of the second penalties is no greater than the predetermined imbalance limit, deploying the blades in the hub in accordance with the second arrangement corresponding to the smallest second penalty, and in the event that the imbalance associated with the smallest of the second penalties is greater than the predetermined imbalance limit, comparing the smallest of the first penalties to the smallest of the second penalties and;

in the event that the smallest second penalty is less than the smallest first penalty, redesignating the second penalties as first penalties, redesignating the second arrangements as first arrangements and repeating the additional steps no more than a predetermined number of times.

4. A method of balancing a bladed rotor having a central hub for receiving a quantity of n removable, radially projecting blades, each of the blades being assigned an initial location on the hub to define an initial configuration of the blades, the method characterized by the steps of:

determining, for the initial configuration, a first penalty associated with each unique first blade arrangement which relocates exactly r1 blades from the locations initially occupied by those exactly r1 blades in the initial configuration to new target locations, r1 being a non-negative integer less than n, and the first penalty representing at least the rotor imbalance and;

in the event that the imbalance associated with the smallest of the first penalties is no greater than a predetermined imbalance limit, deploying the blades in the hub in accordance with the first arrangement corresponding to the smallest first penalty, and in the event that the imbalance associated with the smallest of the first penalties is greater than the predetermined imbalance limit, performing additional steps including:

selecting members for inclusion in a subset of the first arrangements, each subset member being a first arrangement having a penalty no greater than that of any nonselected first arrangement;

determining, for each subset member, a second penalty associated with each unique second blade arrangement which relocates exactly r2 blades from the locations initially occupied by those r2 blades in the subset member to new target locations, r2 being a non-negative integer less than n, and the second penalty representing at least the rotor imbalance, and;

in the event that the imbalance associated with the smallest of the second penalties is no greater the predetermined imbalance limit, deploying the blades in the hub in accordance with the second arrangement corresponding to the smallest second penalty, and in the event that the imbalance associated with the smallest of the second penalties is greater than the predetermined imbalance limit, comparing the smallest of the first penalties to the smallest of the second penalties and;

in the event that the smallest second penalty is less than the smallest first penalty, redesignating the second penalties as first penalties, redesignating the second arrangements as first arrangements and repeating the additional steps no more than a predetermined number of times.

5. The method of claim 1, 2, 3 or 4, r2 being no more than r1.

6. The method of claim 1, 2, 3 or 4, r2 being less than r1.

7. The method of claim 1, 2, 3 or 4, the bladed rotor being a gas turbine engine fan rotor.

8. The method of claim 1, 2, 3 or 4, wherein only a single first arrangement is selected for inclusion in the subset.

9. The method of claim 1, 2, 3 or 4, the first penalty and the second penalty representing only the rotor imbalance.

10. The method of claim 1, 2, 3 or 4, the initial configuration including at least one replacement blade, the remainder of the blades being nonreplacement blades, each first and second arrangement including a group of blades each of whose initial location in the initial configuration and whose target location as defined by the same arrangement are different, the penalty associated with each arrangement including:

a first additive penalty term representating the rotor imbalance of the arrangement, a second additive penalty term representing the quantity of nonreplacement blades in the group, a first penalty reduction term representing the number of pairs of blades in the group whose initial locations in the initial configuration are adjacent, a second penalty reduction term representing the number of pairs of blades in the group whose initial locations in the initial configuration are substantially opposite, and a third penalty reduction term representing the number of pairs of blades in the group that are pairwise exchanged.

* * * * *